(12) United States Patent
Gupta et al.

(10) Patent No.: US 8,555,201 B2
(45) Date of Patent: Oct. 8, 2013

(54) WIRELESS COMMUNICATION DEVICE HAVING DETERMINISTIC CONTROL OF FOREGROUND ACCESS OF THE USER INTERFACE

(75) Inventors: Rashim Gupta, San Diego, CA (US); Mark Aaron Lindner, Superior, CO (US); Fnu Tejaswini, San Diego, CA (US); Alexandra Carey, Santa Cruz, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1082 days.

(21) Appl. No.: 12/134,129

(22) Filed: Jun. 5, 2008

(65) Prior Publication Data

US 2009/0307619 A1    Dec. 10, 2009

(51) Int. Cl.
*G06F 3/14* (2006.01)

(52) U.S. Cl.
USPC ........... 715/810; 715/775; 709/205; 709/224; 710/240; 718/107; 719/328; 600/437; 455/435.2; 455/518; 455/550.1

(58) Field of Classification Search
USPC ......... 715/200–277, 700–867; 700/701–866; 705/50–79; 709/201–229; 345/30–111; 348/206–231.9; 455/518, 550.1, 435.2; 600/437; 710/240; 719/328; 718/107
See application file for complete search history.

(56) References Cited

U.S. PATENT DOCUMENTS

| | | | |
|---|---|---|---|
| 7,106,298 B1 | 9/2006 | Turner et al. | |
| 7,707,249 B2 * | 4/2010 | Spataro et al. | 709/205 |
| 7,773,989 B2 * | 8/2010 | Tobe et al. | 455/435.2 |
| 2004/0015079 A1 * | 1/2004 | Berger et al. | 600/437 |
| 2004/0023646 A1 | 2/2004 | Inami et al. | |
| 2005/0148358 A1 * | 7/2005 | Lin et al. | 455/550.1 |
| 2005/0268014 A1 * | 12/2005 | Geib et al. | 710/240 |
| 2006/0026281 A1 * | 2/2006 | Hodgson et al. | 709/224 |
| 2008/0148298 A1 * | 6/2008 | Chatterjee et al. | 719/328 |
| 2008/0318610 A1 * | 12/2008 | Bhaskaran et al. | 455/518 |
| 2009/0276788 A1 * | 11/2009 | Homma | 718/107 |
| 2011/0258573 A1 * | 10/2011 | Wetzer et al. | 715/775 |

FOREIGN PATENT DOCUMENTS

| | | |
|---|---|---|
| CN | 1480855 A | 3/2004 |
| CN | 101164046 A | 4/2008 |
| JP | 2004078936 A | 3/2004 |
| WO | 0075870 | 12/2000 |
| WO | 2007030682 | 3/2007 |

OTHER PUBLICATIONS

International Search Report, PCT/US2009/043640, International Searching Authority, European Patent Office, Nov. 20, 2009.
Written Opinion, PCT/US2009/043640, International Searching Authority, European Patent Office, Nov. 20, 2009.

* cited by examiner

*Primary Examiner* — Ruay Ho
(74) *Attorney, Agent, or Firm* — Raphael Freiwirth (57) ABSTRACT

A wireless communication device that has one or more applications resident on a computer platform, a wireless communication interface, a display, and a user interface that, at least, appears on the display and through which a user of the wireless communication device interacts with the computer platform. The display is configured to be selectively controlled by the specific user interfaces of one or more applications resident on the computer platform, and the one or more applications and/or an arbiter that is resident on the computer platform will determine which user interface of the one or more applications resident on the computer platform controls the display based upon a predetermined criteria when the user interfaces compete for control of the display.

34 Claims, 4 Drawing Sheets

WIRELESS COMMUNICATION DEVICE HAVING DETERMINISTIC CONTROL OF FOREGROUND ACCESS OF THE USER INTERFACE

BACKGROUND OF THE INVENTION

1. Field of the Invention

The present invention relates to portable wireless communication devices. More specifically, the present invention relates a wireless communication device that can deterministically control which user interface of the resident applications controls the display of the device.

2. Description of the Related Art

In modern wireless communication networks, many of the wireless communication devices have resident computer platforms with operating systems and software applications that can be run, either individually or in parallel, on the computer platform. The software applications can vie for control of the resident user interface for the wireless communication device, which often is displayed on a resident display of the wireless communication device, and several problems can result from the collision of executing applications trying to seize control of the user interface.

For example, in an operating system with a notification mechanism to send events to other resident applications, the operating system will typically use notifications to broadcast events to multiple software applications, such as the receipt of incoming communications, the execution of various applications, and the status of resident hardware components. The resident software applications can register for notifications using a common operating system application-programming interface ("API"). Also, a resident software application can implement a "notify" class and send notifications to other software applications as intended. Once an application receives an event, the resident software application is typically free to act and come to the foreground on the API.

One problem occurs if there are multiple applications that can handle a specific event and they all want to come to the foreground of the UI. This can cause thrashing and undesirable user behavior where each application tries to come to the foreground, and thus, the operating system will not let any one application stay on top in the UI. One prior art solution to this problem has been simply to allow foreground thrashing, as a consequence of the broadcast event model. However, simply letting the UI thrash is undesirable as the applications do have any specified order in which they seize and display upon the UI, and high-priority applications are left to contend with low-priority applications for control.

It would therefore be advantageous to provide a system and method for a wireless communication device to control which of a plurality of resident applications will have control of the UI if multiple applications are simultaneously invoked and compete for control of the UI. Such system and method should be able to prioritize which application will have the UI, without utilizing significant device resources in determining the control. It is thus to such a system and method of a wireless communication device determining resident application control of the UI that the present invention is primarily directed.

SUMMARY OF THE INVENTION

Briefly described, there is provided herein a wireless communication device that has one or more applications resident on a local computer platform, and also includes at least a wireless communication interface, and a display. Each application has a user interface that it uses to interact with the user. The arbiter application that resides on the computer platform controls which application can bring its user interface to the foreground based upon a predetermined criteria, such as a prioritization scheme, a most recently used algorithm, or based upon the nature of the event invoking multiple applications.

In one embodiment, the method of determining which user interface of the resident applications on the computer platform of the wireless communication device controls the display, with the user interface, at least, appearing on the display of the wireless communication device and through which a user of the wireless communication device interacts with resident applications, includes the steps of displaying the user interface on the display of the wireless communication device, where the display is configured to be selectively controlled by the user interface of one or more applications resident on the computer platform, then either receiving a request at an arbiter from one or more of the resident applications to control the display, with the arbiter resident on the computer platform, and determining, at the arbiter, which application of the user interfaces of the one or more resident applications controls the user interface based upon a predetermined criteria, or if the one or more resident applications include priority data indicating a priority of control of the display, the one or more resident applications will determine which user interface of which application controls the display.

The present system and method are therefore advantageous in that they provide a wireless communication device with the ability to control which one of a plurality of invoked or active resident UI applications will have control of the display, such as is caused with an invoking event, to minimize thrashing in control of the display. There are several embodiments to prioritize the application control of the display which allows implementation in a variety of wireless environments. The determination of the control of the display can accordingly be accomplished without having to devote significant device processing resources in arbitrating control of the display.

Other objects, features, and advantages of the present invention will become apparent after review of the Brief Description of the Drawings, Detailed Description of the Invention, and the Claims.

DETAILED DESCRIPTION OF THE INVENTION

In this description, the terms "communication device," "wireless device," "wireless communications device," "PTT communication device," "handheld device," "mobile device," and "handset" are used interchangeably. The terms "call" and "communication" are also used interchangeably. The term "application" as used herein is intended to encompass executable and non-executable software files, raw data, aggregated data, patches, and other code segments. The term "exemplary" means that the disclosed element or embodiment is only an example, and does not indicate any preference of user. All methods of interaction between applications are intended to be encompassed herein, to include all forms of invocation, execution, calling, and data exchanging. Further, like numerals refer to like elements throughout the several views, and the articles "a" and "the" includes plural references, unless otherwise specified in the description.

Figure 1:
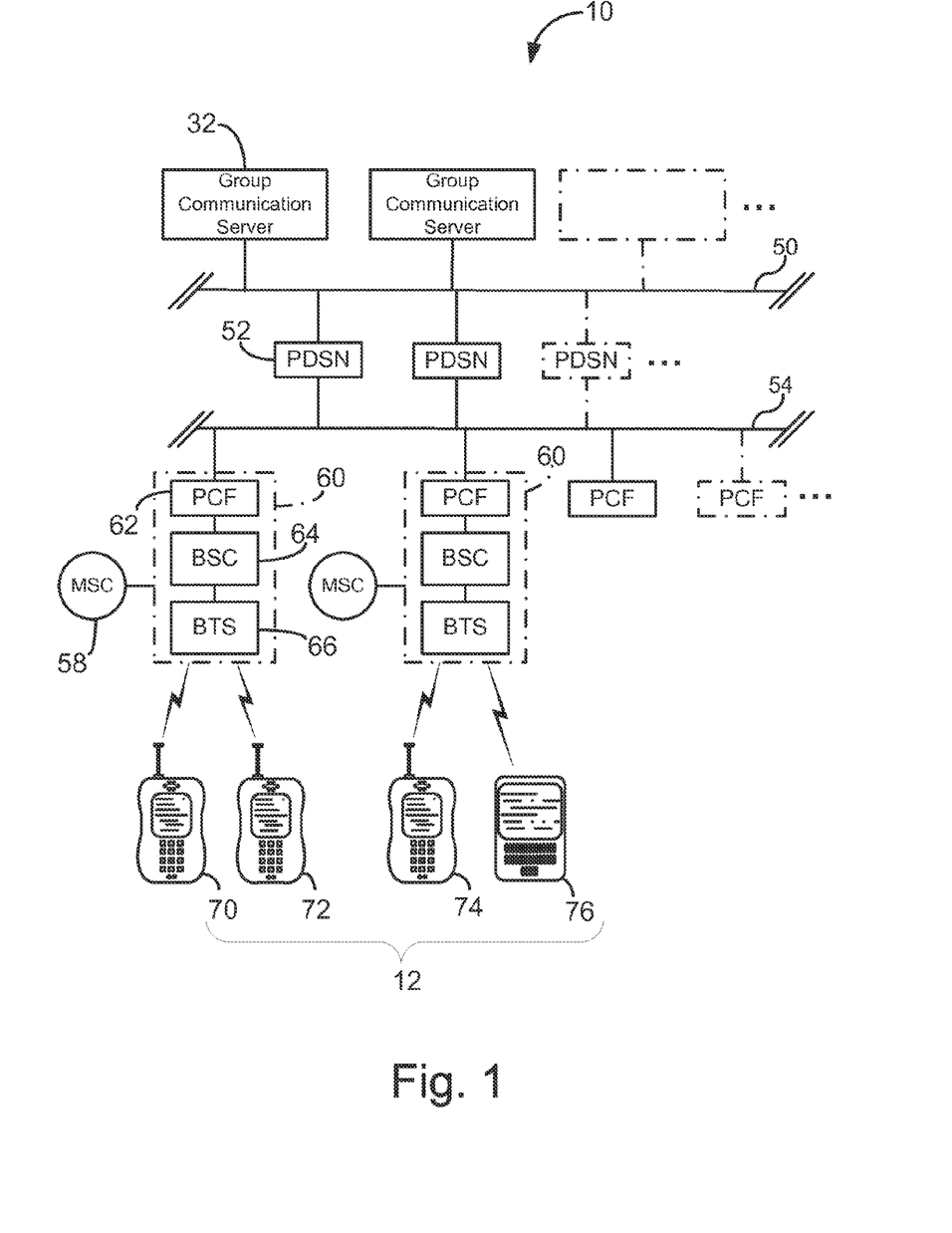
FIG. 1 is a representative diagram of one embodiment of a wireless network in a common cellular telecommunication configuration, having a group communication server control communications between the wireless telecommunication devices of PTT group members.

With reference to the figures in which like numerals represent like elements throughout, FIG. 1 is a representative diagram of one embodiment of a system 10 with a wireless network in a common cellular telecommunication configuration, with communications occurring between the wireless communication devices 70, 72, 74, 76. The system 10 here also includes a series of group communication computer devices (group communication servers) 32 that support a PTT system. The wireless network is merely exemplary and can include any system whereby remote modules communicate over-the-air between and among each other and/or between and among components of a wireless network, including, without limitation, wireless network carriers and/or servers. A series of group communication servers 32 are shown here as connected to a group communication server LAN 50, but other computer devices can be accessible to the LAN 50 to provide functionality to any component on the network. Wireless communication devices 70, 72, 74, 76 can request packet data sessions from the group communication server(s) 32 using a data service option.

The back-office computer devices, such as the group communication server(s) 32, are connected to a wireless service providers packet data service node (PDSN) such as PSDN 52, shown here resident on a carrier network 54. Each PSDN 52 can interface with a base station controller 64 of a base station 60 through a packet control function (PCF) 62. The PCF 62 is typically located in the base station 60. The carrier network 54 controls messages (generally in the form of data packets) sent to a messaging service controller ("MSC") 58. The carrier network 54 communicates with the MSC 58 by a network, the Internet and/or POTS ("plain ordinary telephone system"). Typically, the network or Internet connection between the carrier network 54 and the MSC 58 transfers data, and the POTS transfers voice information. The MSC 58 can be connected to one or more base stations 60. In a similar manner to the carrier network, the MSC 58 is typically connected to the branch-to-source (BTS) 66 by both the network and/or Internet for data transfer and POTS for voice information. The BTS 66 ultimately broadcasts and receives messages wirelessly to and from the wireless devices, such as cellular telephones 70,72,74,76, by short messaging service ("SMS"), or other over-the-air methods known in the art. It should also be noted that carrier boundaries and/or PTT operator network boundaries do not inhibit or prohibit the sharing of data as described herein.

Cellular telephones and mobile telecommunication devices, such as a wireless telephone (74 in FIG. 2), are being manufactured with increased computing capabilities and are becoming tantamount to personal computers and hand-held PDAs. These "smart" cellular telephones allow software developers to create software applications that are downloadable and executable on the processor of the wireless communication device. The wireless communication device, such as cellular telephone 74, can download many types of applications, such as web pages, applets, MIDlets, games and data. In wireless communication devices that have designated a communication group, the wireless communication device can directly connect with the other member of the set and engage in voice and data communication. However, all such direct communications will occur through, or at the control of, the group communication server 32. All data packets of the devices do not necessarily have to travel through the group communication server 32 itself, but the group communication server 32 must be able to ultimately control the communication because it will typically be the only carrier network 54 component that is aware of and/or can retrieve the identity of the members of the communication group, or direct the identity of the members of the communication group 12 to another computer device. It should be appreciated that the number of computer components resident on server-side LAN 50, or across the wireless network, or Internet generally, are not limited.

In addition to voice communications between the wireless communication devices, other media can be sent such as graphic media, to include pictures in JPEG, TIF, and the like, audio files such as MP3, MP4, WAV, and the like. The media can also be streaming media, such as a multimedia application (Powerpoint, MOV file, and the like). The group-directed media can also be streaming media, or an interactive session on another computer device on the wireless communication network, such as a hosted game or private bulletin board. Also, for PTT communications, the group-directed communication could be half-duplex audio and/or video conferencing among members of the communication group in substantial real-time, or in delay.

Figure 2:
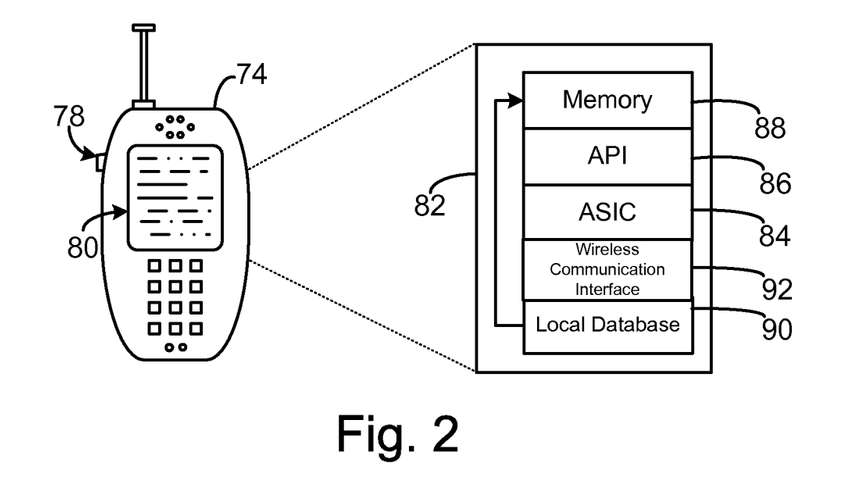
FIG. 2 is a block diagram illustrating the computer platform of the wireless telecommunication device, shown here with a PTT capability.

FIG. 2 is a block diagram illustrating one embodiment of the wireless communication device 74 being a mobile telephone embodied with a PTT button 78 that opens the direct communication to a target set of devices, i.e. other members of the communication group. The wireless communication device 74 is also shown as having a graphics display 80 to the user of the wireless communication device 74. The wireless communication device 74 includes a computer platform 82 that can handle voice and data packets, and receive and execute software applications transmitted across the wireless network to include the group-directed media. The computer platform 82 includes, among other components, an application-specific integrated circuit ("ASIC") 84, or other processor, microprocessor, logic circuit, programmable gate array, or other data processing device. The ASIC 84 is installed at the time of manufacture of the wireless communication device 74 and is not normally upgradeable. The ASIC 84 or other processor executes an application programming interface ("API") layer 86, which includes the resident application environment, and can include the operating system loaded on the ASIC 84. The resident application environment interfaces with any resident programs in the memory 88 of the wireless communication device 74. An example of a resident application environment is the "binary runtime environment for wireless" (BREW®) software developed by QUALCOMM® for wireless communication device platforms.

As shown here, the wireless communication device 74 can be a mobile telephone, with a graphics display 80, but can also be any wireless communication device with a computer platform 82 as known in the art, such as a mobile device 76, or even a separate computer platform 82 that has a wireless communication portal, and may otherwise have a wired connection to a network or the Internet. Further, the memory 88 can be comprised of read-only or random-access memory (RAM and ROM), EPROM, EEPROM, flash cards, or any memory common to computer platforms. The computer platform 82 can also include a local database 90 for storage of software applications not actively used in memory 88. The local database 90 is typically comprised of one or more flash memory cells, but can be any secondary or tertiary storage device as known in the art, such as magnetic media, EPROM, EEPROM, optical media, tape, or soft or hard disk. The graphics display 80 can present not only information about the ongoing group call, but also the information on the group-directed media, to include a file preview as is more fully described herein.

In this embodiment of the communication device 74, the computer platform 82 also includes a direct communication interface 92 that can open the direct communication channel from the wireless communication device 74. The direct communication interface 92 can also be part of the standard communication interface for the wireless communication device 74 which ordinarily carries the voice and data transmitted to and from the wireless communication device 74. The direct communication interface 92 typically is comprised of hardware as is known in the art.

In overview, the wireless communication device 74 has one or more applications resident upon the computer platform 82, which also includes the wireless communication interface 92, a display 80, and a user interface that, at least, appears on the display 80 (with one example of the user interface 140 shown in FIG. 4) and through which a user of the wireless communication device 74 interacts with the computer platform 82. Each application has a user interface, and in one embodiment, an arbiter (128 in FIG. 3B) can be resident on the computer platform 82 and configured to determine which application of the one or more VI applications controls the display 80 based upon a predetermined criteria. Examples of the predetermined criteria are: a priority list; allowing the last application to control the user interface to again control the user interface (most-recently-used algorithm); assigning a class to the one or more applications such that determining control is based upon the class of the application; allowing the control of the user interface based upon the specific type of data being handled in the user interface; and allowing the control based upon the type of data being received at the wireless communication interface 92. In other embodiments, the resident applications themselves can determine the priority, either alone or in conjunction with an arbiter 128, using predetermined criteria in the same manner as an arbiter 128.

Figure 3A:
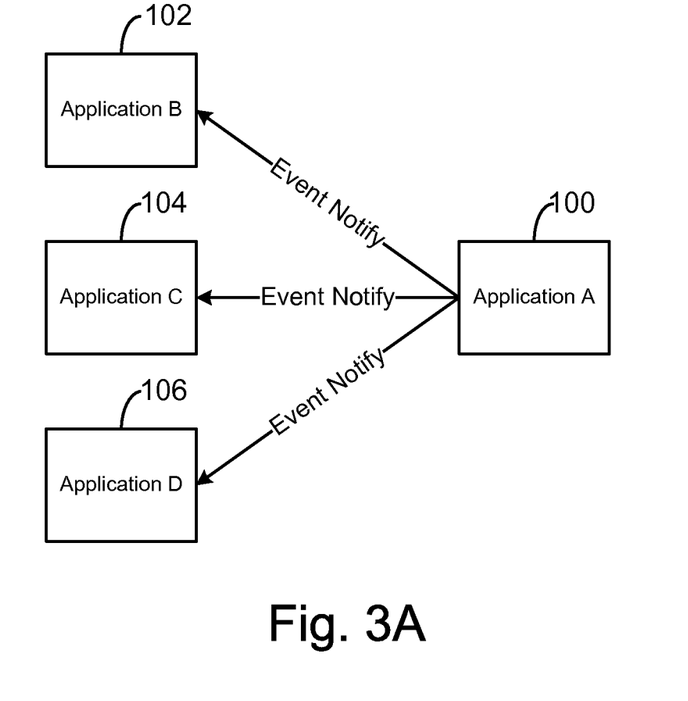
FIG. 3A is a block diagram of a wireless communication device resident application sending event notifications to a plurality of other device-resident applications.

FIG. 3A is a block diagram of a wireless communication device resident application (Application A) 100 sending event notifications to a plurality of other device-resident applications, shown here as UI Application B 102, UI Application C 104, and UI Application D 106. Because they are simultaneously invoked, any of UI Applications 102, 104, 106 can come to the foreground of the display 80 (such as in FIG. 4) depending on when they get the event notification, in the worst case without any arbitration of control of the display, the applications can keep over-riding each other causing UI thrashing. However, once an arbiter 128 is present as is shown in FIG. 3B, the control of the UI relative to multiple simultaneous, and potentially ongoing, requests from a plurality of application, will be determined by the arbiter 128 to at least lessen, and preferably prevent, the UI thrashing.

Figure 3B:
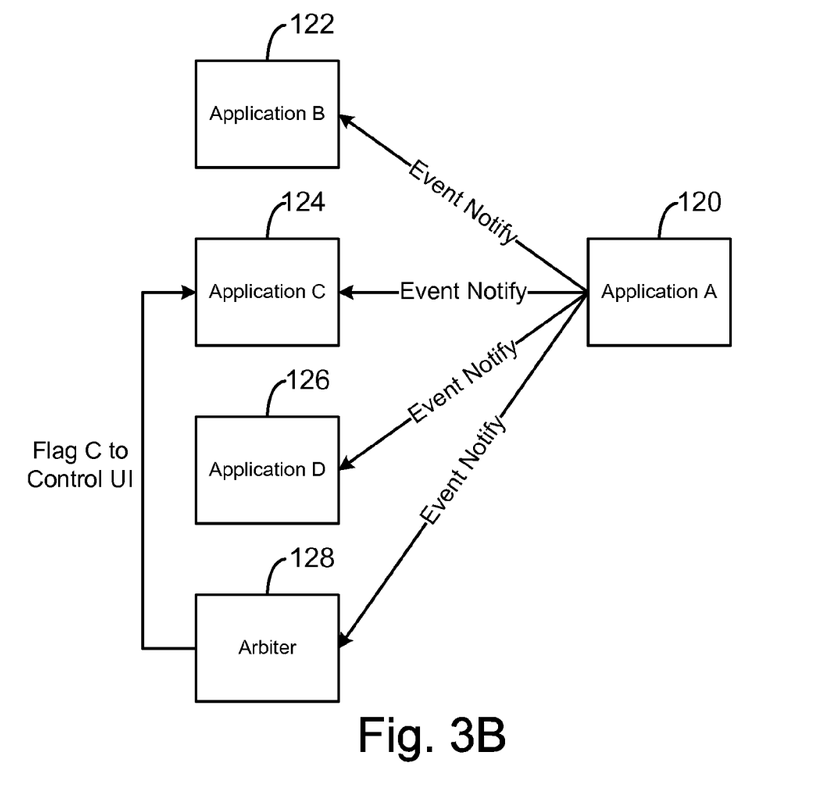
FIG. 3B is a block diagram similar to FIG. 3A, but with an arbiter also receiving an event notice and sending a flag to one of the other applications receiving the notice to indicate that application has priority in controlling the UI.

FIG. 3B is a block diagram similar to FIG. 3A, but embodied with an arbiter 128 also receiving an event notice from UI Application A 120, along with UI Application B 122, UI Application C 124, and UI Application D 126. The arbiter 128 determines which UI application should come to the foreground given the event notification, either based upon a predetermined criteria as is further described herein, or can make the determination at the time of receipt of the event notification. The arbiter 128 will then send a flag to the UI application determined to have priority for controlling the display, shown here as Application C 124, and the resident operating system will allow Application C 124 to control the display until another application with the arbiter flag is received at the operating system. Alternately, each application desiring to come to the foreground can query the arbiter 128 for permission to take the foreground of the display.

Figure 4:
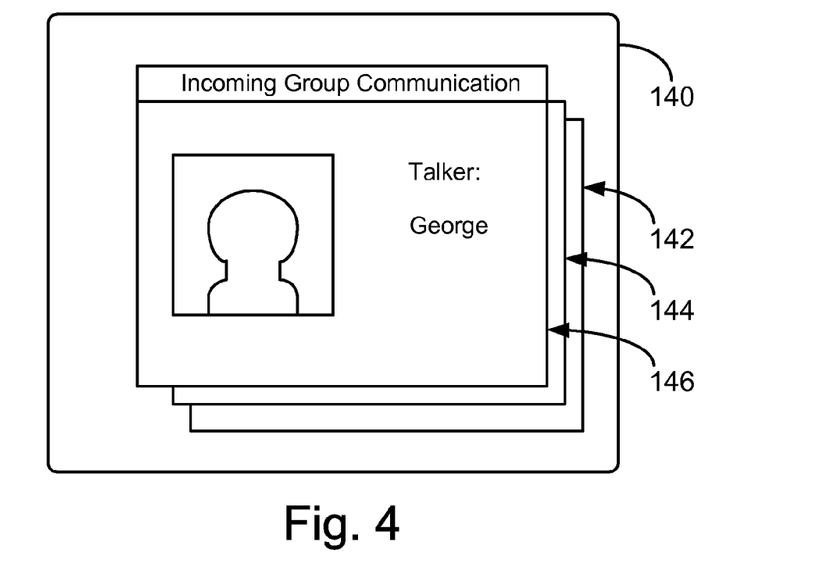
FIG. 4 is a representative illustration of one embodiment of a display of a UI for a wireless communication device with a plurality of resident applications interfaces (APIs) vying for control of the primary display.

FIG. 4 is a representative illustration of one embodiment of a display of a wireless communication device 74 with a plurality of resident UI applications vying for control of, and primary display on, the UI (or UI application) 140. Here, the primary UI application 140 is the "Incoming Group Communication" Interface 146, and other interfaces 142 and 144 remain in the background of the UI application 140. The interfaces shown here are in a "windowed" arrangement, a common graphic interface in user interfaces. The UI control methodology described herein is equally applicable to other UI systems and display schemas, control interfaces for the user to access the computer platform 82.

In one embodiment, the arbiter 128 can utilize a provisioned "priority list" of applications, where Application A 120 has its code changed to allow a list of class IDs to be provisioned, possibly by a network carrier or other entity. This list of class IDs are provisioned in the order of priority of the applications that should be allowed to come to the foreground of the UI 140. For example, one may choose that Application C 124 should have a higher priority over Applications B 122 or D 126 to come to the foreground, and after broadcast of an event to all of the applications, the broadcast also lists the chosen class ID for Application C 124 in the event notify payload. When the applications receive the event notification, they must check if their class ID matches with what is sent in the payload and if it does, then it should come to the foreground. The arbiter 128 can merely verify the UI control in this embodiment, and does not actually have to grant control as the class ID will be apparent to each application. However, this embodiment does require additional overhead as each resident application will have to be configured to understand the class IDs.

Another embodiment to determine control of the UI 140 is to use a simple algorithm, such as having the last application to come to the foreground to accept an event of a particular event class (alert, call, presence, etc.) is the next application to come to the foreground. In such embodiment, Application A 120 will broadcast the last known foreground application class ID with the event and the receiving application is advised to compare its own class ID to the suggested last known foreground application's class ID, and come to the foreground of the UI 140 only if the two match. However, this can cause "edge case" problems, such as initial thrashing in the case there was no last known foreground application (fresh start-up), or when it is not clear which application was last in control, so a default priority class should still be used.

In another embodiment, a preferred controlling of applications is automatically set. The application itself can register itself as the primary application to come to the foreground to process an event of a particular event class (alert, call, presence, etc.). In such embodiment, the application can retrieve the class ID for the currently-registered application for a particular event class, and make a decision about whether to overwrite the stored class ID with its own. If none is stored, the application can set its own class ID as the primary foreground application for a particular event class. In a further embodiment, there can be a provisioned list based upon the type of event and the activity being invoked, such as provision a list of MIME-types in Application A 120. This set of MIME-types will be provisioned in the order of and Application A 120 will broadcast the events to all the applications with the MIME-type of the highest priority included in the payload of the event notification. When the applications receive this event, they must see if the included MIME-type matches with what they have been provisioned as and will come to the foreground only if they match. In essence, this embodiment uses MIME-types instead of Class IDs. However, to implement this embodiment, the applications must co-operate and must not come to the foreground if their class ID does not match with what is sent in the event, which requires additional programming in each module.

Figures 5, 6:
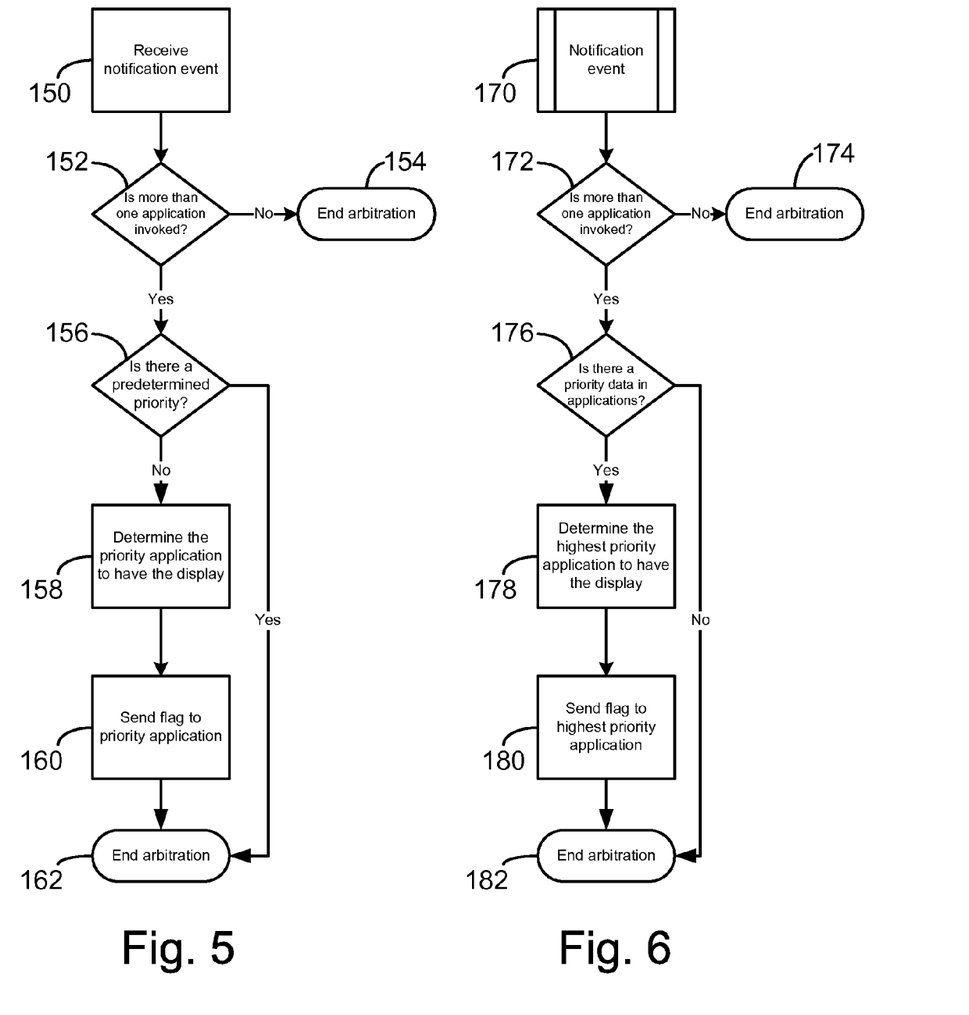
FIG. 5 is a flowchart of one embodiment of a method for an arbiter determining priority for display control between a plurality of invoked wireless communication device-resident applications.
FIG. 6 is a flowchart of one embodiment of a method for determining priority for display control between a plurality of invoked wireless communication device-resident applications based upon priority data resident in the applications seeking control of the display.

FIG. 5 is a flowchart of one embodiment of a method for an arbiter 128 determining priority for display 80 control between a plurality of invoked wireless communication device-resident applications. The arbiter 128 receives notice of an event, shown by step 150, and then a determination is made as to whether more than one application invoked, as shown at decision 152. If no more than one application is invoked at decision 152, the arbitration process is terminated, as shown at termination 154. Otherwise, if more than one application is invoked at decision 152, a decision is then made as to whether there is a predetermined priority for the application, as shown at decision 156, and if there is a predetermined priority, and then the arbitration terminates, as shown at termination 162.

Otherwise, if there is not a predetermined priority criteria at decision 156, the priority of the application to have the display 80 is determined, as shown at step 158, and then a flag is sent to the priority application to control the display 80, as shown at step 160, and the arbitration again terminates as shown at termination 162. The priority can be determined at step 158 with the methodology as set forth above, or a combination of any of the above methodologies.

FIG. 6 is a flowchart of one embodiment of a method for determining priority for display control between a plurality of invoked wireless communication device-resident applications based upon priority data resident in the applications seeking control of the display 80. A notification event occurs as shown by predefined process 170, and then a determination is made as to whether more than one application invoked, as shown at decision 172. If no more than one application is invoked at decision 172, no arbitration process is required and the process is terminated, as shown at termination 174. Otherwise, if more than one application is invoked at decision 172, a decision is then made as to whether there is predetermined priority data present in the applications attempting to control the display 80, as shown at decision 176, and if there is not predetermined priority data present, the arbitration terminates, as shown at termination 182. Otherwise, if there is predetermined priority criteria present at decision 176, the highest priority application to have the display 80 is determined, as shown at step 178, and then a flag is sent to the highest priority application to control the display 80, as shown at step 180, and the process again terminates as shown at termination 182. Alternately, the priority can be determined at step 178 with the methodology as set forth above, or a combination of any of the above methodologies.

It can therefore be seen that the wireless communication device 74 provides an inventive method of determining which resident application on a computer platform 82 of wireless communication device 74 controls the display 80 thereof, with the user interface 140, at least, appearing on a display 80 of the wireless communication device 74 and through which a user of the wireless communication device 74 interacts with the computer platform 82, which includes displaying the user interface 140 on the display 80 of the wireless communication device 74, the user interface 140 configured to be selectively controlled by one or more applications resident on the computer platform 82. In one embodiment, the method includes receiving a request at an arbiter 128 from one or more of the resident applications to control the display 80, with the arbiter 128 resident on the computer platform 82, and then determining, at the arbiter 128, which application of the one or more resident applications controls the display 80 based upon a predetermined criteria.

In one embodiment, where each of the one or more resident applications include a priority data that determines the priority for the application to control the display 80, the method includes the steps of, after display of the user interface 140, invoking a plurality of the one or more resident applications, as shown in FIG. 3A, and determining which application of the one or more resident applications controls the display 80 based upon the priority data within each invoked application. Such determination can be based upon the use of a class identification that determines the priority for the application to control the display 80, or alternately can be based upon one of the plurality of invoked applications seizing control of the display 80 based upon the priority data. In this embodiment, the priority data ranking will preferably keep display control to the highest priority application to lessen, or preferably prevent, thrashing.

When embodied with an arbiter 128, the step of determining which application of the one or more resident applications controls the display 80 based upon a predetermined criteria is utilizing a priority list for applications attempting to control the display 80. Alternately, determining, at the arbiter 128, which application of the one or more resident applications controls the display 80 based upon a predetermined criteria can be allowing the last application to control the display 80 to again control the display 80. Also, determining, at the arbiter 120, which application of the one or more resident applications controls the display 80 based upon a predetermined criteria can be assigning a class to the one or more applications and determining control is based upon the class of the application. Furthermore, determining, at the arbiter 128, which application of the one or more resident applications controls the display 80 can be allowing the control of the display 80 based upon the type of data being handled in the user interface 140, or can be based upon the type of data being received at the wireless communication interface 92.

The method can further include displaying data to the user of the wireless communication device 74 at the user interface 140, and if the user interface 140 is a display screen, such as interface 140 on the display 80, the method can include displaying graphic information to the user of the wireless communication device 74 at the display screen 80, such as the APIs 142,144,146. Alternately, where user interface is a control interface for the user to access the computer platform 82, the method can further include displaying graphic information to the user of the wireless communication device 74 at the display screen 80 to control a device function. If the user interface 140 includes one or more user interface applications configured to selectively control the user interface 140, the arbiter 120 can further be configured to selectively allow control of the display 80 to one or more user interface applications, such as the windowed APIs 142,144,146.

In view of the methods being executable on a mobile device and other computer platforms, the method can accordingly be performed by a program resident in a non-transitory computer readable medium, where the program directs the mobile device or other computer device having a computer platform to perform the steps of the method. The non-transitory computer readable medium can be the memory of the server, or can be in a connective database. Further, the non-transitory computer readable medium can be in a secondary storage media that is loadable onto a wireless communications device computer platform, such as a magnetic disk or tape, optical disk, hard disk, flash memory, or other storage media as is known in the art.

In one or more exemplary embodiments, the functions described may be implemented in hardware, software, firmware, or any combination thereof. If implemented in software, the functions may be stored as one or more instructions or code on a non-transitory computer-readable medium. Non-transitory computer-readable media includes computer storage media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed is:

1. A wireless communication device, comprising:
   a computer platform having an operating system (OS), a plurality of applications resident thereupon, an arbiter resident thereupon, and a wireless communication interface;
   a display, wherein the plurality of applications each have, at least, a user interface that appears on the display and through which a user of the wireless communication device interacts with the computer platform, the display configured to be selectively controlled by a user interface of one of the plurality of applications resident on the computer platform; and wherein the computer platform is configured to:
   receive a notification event from at least one of the OS and one of the resident applications;
   determine whether the notification event simultaneously invokes the plurality of applications resident on the computer platform;
   determine, via the arbiter, when the notification event simultaneously invokes the plurality of applications resident on the computer platform, which application of the plurality of resident applications controls the display based upon predetermined criteria; and
   override the arbiter's determination of which application of the plurality of resident applications controls the display based upon priority data included within the plurality of resident applications.

2. The device of claim 1, wherein the predetermined criteria comprises a priority list for applications attempting to control the display.

3. The device of claim 1, wherein the predetermined criteria allow an application that was controlling the display prior to the notification event to again control the user interface.

4. The device of claim 1, wherein the predetermined criteria assigns a class to each of the plurality of resident applications and determining control is based upon the class of each respective application.

5. The device of claim 1, wherein the predetermined criteria allow a control of the display based upon a type of data being handled in the user interface.

6. The device of claim 5, wherein the data is media displayable to the user of the wireless communication device.

7. The device of claim 1, wherein the predetermined criteria allow a control of the display based upon a type of data being received at the wireless communication interface.

8. The device of claim 1, wherein the display is a display screen on the wireless communication device.

9. The device of claim 1, wherein the user interface is a control interface for the user to access the computer platform.

10. A method of determining which user interface of a resident application on a computer platform of a wireless communication device controls a display thereof, the user interface, at least, appearing on the display and through which a user of the wireless communication device interacts with the computer platform, comprising:
    displaying the user interface on the display of the wireless communication device, the display configured to be selectively controlled by the user interface of one of a plurality of applications resident on the computer platform;
    receiving a notification event from at least one of an operating system of the computer platform and one of the resident applications;
    determining whether the notification event simultaneously invokes the plurality of applications resident on the computer platform;
    determining, via an arbiter resident on the computer platform, when the notification event simultaneously invokes the plurality of applications resident on the computer platform, which application of the plurality of resident applications controls the display based upon predetermined criteria; and
    overriding the arbiter's determination of which application of the plurality of resident applications controls the display based upon priority data included within the plurality of resident applications.

11. The method of claim 10, wherein determining-which application of the plurality of resident applications controls the display based upon predetermined criteria comprises utilizing a priority list for applications attempting to control the display.

12. The method of claim 10, wherein determining which application of the plurality of resident applications controls the display based upon the predetermined criteria comprises allowing an application that was controlling the display prior to the notification event to again control the display.

13. The method of claim 10, wherein determining which application of the plurality of resident applications controls the display based upon the predetermined criteria comprises assigning a class to each of the plurality of resident applications and determining control is based upon the class of each respective application.

14. The method of claim 10, wherein determining which application of the plurality of resident applications controls the display based upon the predetermined criteria comprises allowing a control of the display based upon a type of data being handled in the display.

15. The method of claim 10, further comprising displaying data to the user of the wireless communication device at the display.

16. The method of claim 10, wherein determining which application of the plurality of resident applications controls the display based upon the predetermined criteria comprises allowing a control of the display based upon a type of data being received at the wireless communication interface.

17. The method of claim 10, wherein the display is a display screen on the wireless communication device, and further comprising displaying graphic information to the user of the wireless communication device at the display screen.

18. The method of claim 10, wherein the display is a control interface for the user to access the computer platform further comprising displaying graphic information to the user of the wireless communication device at a display screen.

19. A non-transitory computer readable medium having stored thereon processor-executable instructions configured to cause a processor to perform operations, comprising:
- displaying a user interface on a display of a wireless communication device, the display configured to be selectively controlled by the user interface of one of a plurality of applications resident on a computer platform of the wireless communication device;
- receiving a notification event from at least one of an operating system of the computer platform and the one of the resident applications;
- determining whether the notification event simultaneously invokes the plurality of applications resident on the computer platform;
- determining, via an arbiter resident on the computer platform, when the notification event simultaneously invokes the plurality of applications resident on the computer platform, which application of the plurality of resident applications controls the display based upon predetermined criteria; and
- overriding the arbiter's determination of which application of the plurality of resident applications controls the display based upon priority data included within the plurality of resident applications.

20. A wireless communication device, comprising:
- means for displaying a user interface to a user of the wireless communication device, the means for displaying configured to be selectively controlled by a user interface of one of a plurality of applications resident on a computer platform of the wireless communication device;
- means for receiving a notification event from at least one of an operating system of the computer platform and the one of the resident applications;
- means for determining whether the notification event simultaneously invokes the plurality of applications resident on the computer platform;
- means for determining, when the notification event simultaneously invokes the plurality of applications resident on the computer platform, which application of the plurality of resident applications controls the means for displaying based upon predetermined criteria; and
- means for overriding the determination of the controlling application based upon priority data included within the plurality of resident applications.

21. The non-transitory computer readable medium of claim 19, wherein the stored processor-executable instructions are configured to perform operations further comprising:
- utilizing a priority list for applications attempting to control the display to determine which application of the plurality of resident applications controls the display.

22. The non-transitory computer readable medium of claim 19, wherein the stored processor-executable instructions are configured to perform operations further comprising:
- allowing a last application to control an application that was controlling the display prior to the notification event to again control the display.

23. The non-transitory computer readable medium of claim 19, wherein the stored processor-executable instructions are configured to perform operations further comprising:
- assigning a class to each of the plurality of applications; and
- determining control based upon the class of each respective application.

24. The non-transitory computer readable medium of claim 19, wherein the stored processor-executable instructions are configured to perform operations further comprising:
- allowing a control of the display based upon a type of data being handled in the display.

25. The non-transitory computer readable medium of claim 19, wherein the stored processor-executable instructions are configured to perform operations further comprising:
- displaying data to a user of the wireless communication device at the display.

26. The non-transitory computer readable medium of claim 19, wherein the stored processor-executable instructions are configured to perform operations further comprising:
- allowing a control of the display based upon a type of data being received at the wireless communication interface.

27. The non-transitory computer readable medium of claim 19, wherein the stored processor-executable instructions are configured to perform operations further comprising:
- displaying graphic information to a user of the wireless communication device at a display screen of the wireless communication device.

28. The wireless communication device of claim 20, further comprising:
- means for utilizing a priority list for applications attempting to control the means for displaying the user interface to determine which application of the plurality of resident applications controls the means for displaying the user interface.

29. The wireless communication device of claim 20, further comprising:
- means for allowing an application that was controlling the means for displaying the user interface prior to the notification event to again control the means for displaying the user interface.

30. The wireless communication device of claim 20, further comprising:
- means for assigning a class to each of the plurality of applications; and
- means for determining control based upon the class of each respective application.

31. The wireless communication device of claim 20, further comprising:
- means for allowing a control of the means for displaying the user interface based upon a type of data being handled in the means for displaying the user interface.

32. The wireless communication device of claim 20, further comprising:
- means for displaying data to the user of the wireless communication device at the means for displaying the user interface.

33. The wireless communication device of claim 20, further comprising:
- means for allowing a control of the means for displaying the user interface based upon a type of data being received at the wireless communication interface.

34. The wireless communication device of claim 20, further comprising:
- means for displaying graphic information to the user of the wireless communication device at a display screen of the wireless communication device.

\* \* \* \* \*